US009703651B2

(12) United States Patent
Hanumantharaya et al.

(10) Patent No.: US 9,703,651 B2
(45) Date of Patent: Jul. 11, 2017

(54) PROVIDING AVAILABILITY OF AN AGENT VIRTUAL COMPUTING INSTANCE DURING A STORAGE FAILURE

(71) Applicant: VMWARE, INC., Palo Alto, CA (US)

(72) Inventors: Vinaya Hanumantharaya, Bangalore (IN); Santhosh Marakala, Bangalore (IN); Kiran Eshwarappa, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 150 days.

(21) Appl. No.: 14/822,915

(22) Filed: Aug. 11, 2015

(65) Prior Publication Data

US 2016/0364304 A1 Dec. 15, 2016

(30) Foreign Application Priority Data

Jun. 15, 2015 (IN) .......................... 2992/CHE/2015

(51) Int. Cl.
*G06F 11/07* (2006.01)
*G06F 11/20* (2006.01)
*G06F 11/16* (2006.01)
*G06F 9/455* (2006.01)

(52) U.S. Cl.
CPC ...... *G06F 11/2017* (2013.01); *G06F 9/45558* (2013.01); *G06F 11/1612* (2013.01); *G06F 11/1666* (2013.01); *G06F 2009/45583* (2013.01); *G06F 2009/45591* (2013.01); *G06F 2201/85* (2013.01)

(58) Field of Classification Search
CPC ............ G06F 11/2069; G06F 11/2094; G06F 11/2023; G06F 11/203

USPC .................................................. 714/4.11, 6.3
See application file for complete search history.

(56) References Cited

U.S. PATENT DOCUMENTS

| | | | |
|---|---|---|---|
| 7,467,191 B1* | 12/2008 | Wang | G06F 11/2092 709/221 |
| 2011/0265085 A1* | 10/2011 | Kedem | G06F 9/45558 718/1 |
| 2012/0030440 A1* | 2/2012 | Miwa | G06F 3/0617 711/162 |
| 2013/0036322 A1* | 2/2013 | Bauer | H04L 41/0668 714/4.1 |
| 2013/0042153 A1* | 2/2013 | McNeeney | G06F 11/366 714/38.1 |
| 2013/0047153 A1* | 2/2013 | Emaru | G06F 3/0607 718/1 |

(Continued)

*Primary Examiner* — Chae Ko

(57) ABSTRACT

The present disclosure includes detecting a failure associated with a first storage location on which a first agent virtual computing instance (AVCI) is deployed, wherein the first AVCI is being executed by a first hypervisor, stopping the execution of the first AVCI, determining whether a second AVCI that provides services analogous to the first AVCI is being executed by a second hypervisor and is deployed on a second storage location, creating a linked clone of the second AVCI on the second storage location responsive to the second AVCI being executed by the second hypervisor and deployed on the second storage location, redeploying the first AVCI on the second storage location responsive to the second AVCI not being executed by the second hypervisor or not deployed on the second storage location, and deleting files of the first AVCI from the first storage location after the failure is corrected.

20 Claims, 8 Drawing Sheets

(56) References Cited

U.S. PATENT DOCUMENTS

| | | | |
|---|---|---|---|
| 2013/0074065 A1* | 3/2013 | McNeeney | G06F 11/141 |
| | | | 718/1 |
| 2013/0091335 A1* | 4/2013 | Mulcahy | G06F 11/2038 |
| | | | 711/163 |
| 2014/0101279 A1* | 4/2014 | Nagami | H04L 67/1097 |
| | | | 709/213 |
| 2014/0173113 A1* | 6/2014 | Vemuri | H04L 41/5022 |
| | | | 709/226 |
| 2015/0212910 A1* | 7/2015 | Gondi | G06F 11/2033 |
| | | | 714/6.3 |
| 2016/0154713 A1* | 6/2016 | Zhu | H04L 41/5051 |
| | | | 714/4.12 |
| 2017/0005878 A1* | 1/2017 | Strandzhev | H04L 41/20 |

\* cited by examiner

PROVIDING AVAILABILITY OF AN AGENT VIRTUAL COMPUTING INSTANCE DURING A STORAGE FAILURE

RELATED APPLICATIONS

Benefit is claimed under 35 U.S.C. 119(a)-(d) to Foreign application Serial No. 2992/CHE/2015 filed in India entitled "PROVIDING AVAILABILITY OF AN AGENT VIRTUAL COMPUTING INSTANCE DURING A STORAGE FAILURE", on Jun. 15, 2015, by VMware, Inc., which is herein incorporated in its entirety by reference for all purposes.

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs) (also commonly referred to as virtual machines (VMs)) have been introduced to lower data center capital investment in facilities and operational expenses and reduce energy consumption. A VCI is a software implementation of a computer that executes application software in a manner analogous to a physical computer. VCIs have the advantage of not being bound to physical resources, which allows VCIs to be moved around and scaled to meet changing demands of an enterprise without affecting the use of the enterprise's applications. In virtualized environments, some VCIs can provide other, dependent, VCIs with services (e.g., solutions) that extend functionalities of those dependent VCIs.

DETAILED DESCRIPTION

Figure 1:
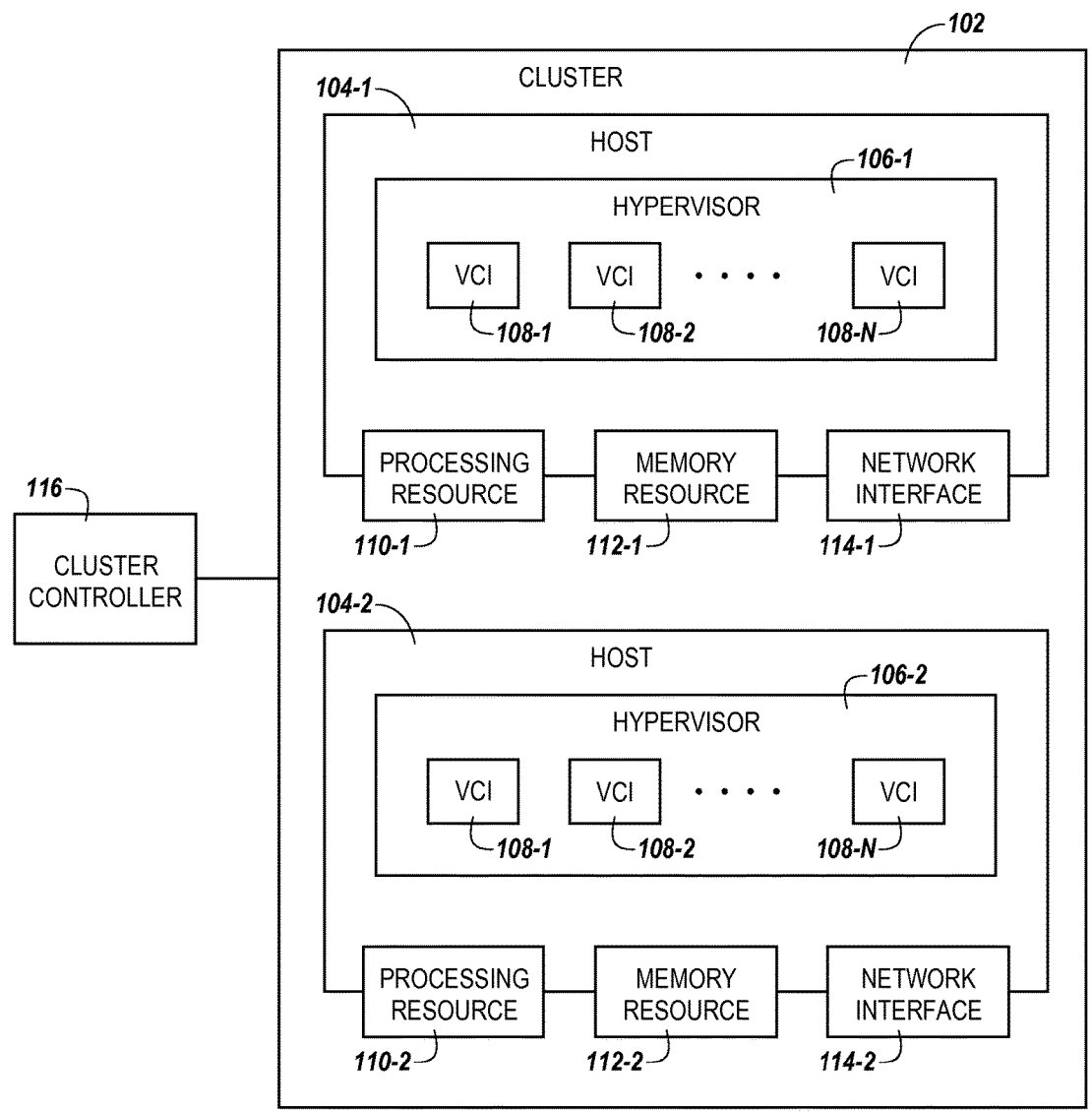
FIG. 1 is a diagram of a system for providing availability of an agent VCI during a storage failure according to a number of embodiments of the present disclosure.

The term "virtual computing instance" (VCI) covers a range of computing functionality, such as virtual machines, virtual workloads, data compute nodes, clusters, and containers, among others. The term "virtual machine" (VM) refers generally to an isolated user space instance, which can be executed within a virtualized environment. Other technologies aside from hardware virtualization can provide isolated user space instances, also referred to as data compute nodes. Data compute nodes may include non-virtualized physical hosts, VMs, containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads. The term "VCI" covers these examples and combinations of different types of data compute nodes, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

A number of embodiments of the present disclosure can provide availability of an agent VCI during a storage failure. A storage failure may result from a loss of a connection between a hypervisor executing a VCI and a storage location on which that VCI is deployed. The storage failure may be a network failure, a hardware failure, and/or a disaster-related failure, for instance. The storage failure may, in some instances herein, be referred to as a failure associated with a storage location (e.g., a datastore). According to a number of embodiments herein, a VCI is "deployed" on a storage location in the sense that the storage location provides storage for a "disk" associated with the VCI. As used herein with respect to VCIs, a "disk" is a representation of memory resources (e.g., memory resources 112-1 illustrated in FIG. 1) that are used by a VCI. As used herein, "memory resource" includes primary storage (e.g., cache memory, registers, and/or main memory such as random access memory (RAM)) and secondary or other storage (e.g., mass storage such as hard drives, solid state drives, removable media, etc., which may include non-volatile memory). The term "disk" does not imply a single physical memory device. Rather, "disk" implies a portion of memory resources that are being used by a VCI, regardless of how many physical devices provide the memory resources.

A particular type of VCI, called an agent VCI (hereinafter referred to as "AVCI"), can be deployed as part of a solution for the deployment and/or management of virtual solutions, for instance. AVCIs can be executed to perform specific functions for a virtual infrastructure; that is, AVCIs can provide services (e.g., functionality) to other VCIs, which may be referred to as "dependent VCIs." For example, an AVCI can provide an anti-virus function to one or more dependent VCIs. In some instances, proper execution of AVCIs and dependent VCIs may involve ensuring that the services provided by an AVCI are available before any of its dependent VCIs are executed.

An AVCI can be deployed on a same storage location as its dependent VCI(s). In some instances, an AVCI can be deployed on a different storage location than its dependent VCI(s). An AVCI can be executed by a same hypervisor as its dependent VCI(s).

When an AVCI and its dependent VCI(s) are deployed on the same storage location, an outage of the AVCI due to a storage failure may present little or no issue because, in such cases, the dependent VCI(s) can be restarted on (executed by) another hypervisor having a connection to the storage location. However, in cases where the AVCI and its dependent VCI(s) are deployed on different storage locations, the storage failure may prevent the dependent VCI(s) from receiving the services offered by the AVCI. Any VCIs dependent upon the AVCI may be unavailable during the failure. In contrast, embodiments of the present disclosure can provide the AVCI—and thus its services—to its dependent VCIs in the event of such a storage failure, and can do so without user input. As described below, providing that availability may entail the creation of a linked clone (e.g., a full clone) of an AVCI and/or the redeployment of an AVCI to support a dependent VCI that is deployed on a different storage location. Availability can be provided, in accordance with embodiments of the present disclosure, across clusters and/or datacenters, for instance.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 708 in FIG. 7. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of a system for providing availability of an AVCI during a storage failure according to a number of embodiments of the present disclosure. The system can include a cluster 102 in communication with a cluster controller 116. The cluster 102 can include a first host 104-1 with processing resources 110-1 (e.g., a number of processors), memory resources 112-1, and/or a network interface 114-1. Similarly, the cluster 102 can include a second host 104-2 with processing resources 110-2, memory resources 112-2, and/or a network interface 114-2. Though two hosts are shown in FIG. 1 for purposes of illustration, embodiments of the present disclosure are not limited to a particular number of hosts. For purposes of clarity, the first host 104-1 and/or the second host 104-2 (and/or additional hosts not illustrated in FIG. 1) may be generally referred to as "host 104." Similarly, reference is made to "hypervisor 106," "VCI 108," "processing resources 110," memory resources 112." and "network interface 114," and such usage is not to be taken in a limiting sense.

The host 104 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 104-1 can incorporate a hypervisor 106-1 that can execute a number of VCIs 108-1, 108-2, . . . , 108-N (referred to generally herein as "VCIs 108"). Likewise the host 104-2 can incorporate a hypervisor 106-2 that can execute a number of VCIs 108. The hypervisor 106-1 and the hypervisor 106-2 are referred to generally herein as a hypervisor 106. The VCIs 108 can be provisioned with processing resources 110 and/or memory resources 112 and can communicate via the network interface 114. The processing resources 110 and the memory resources 112 provisioned to the VCIs 108 can be local and/or remote to the host 104. For example, in a software defined data center, the VCIs 108 can be provisioned with resources that are generally available to the software defined data center and not tied to any particular hardware device. By way of example, the memory resources 112 can include volatile and/or non-volatile memory available to the VCIs 108. The VCIs 108 can be moved to different hosts (not specifically illustrated), such that a different hypervisor manages (e.g., executes) the VCIs 108. The host 104 can be in communication with the cluster controller 116. An example of the cluster controller 116 is illustrated and described in more detail with respect to FIG. 3. In some embodiments, the cluster controller 116 can be a server, such as a web server.

Figure 2:
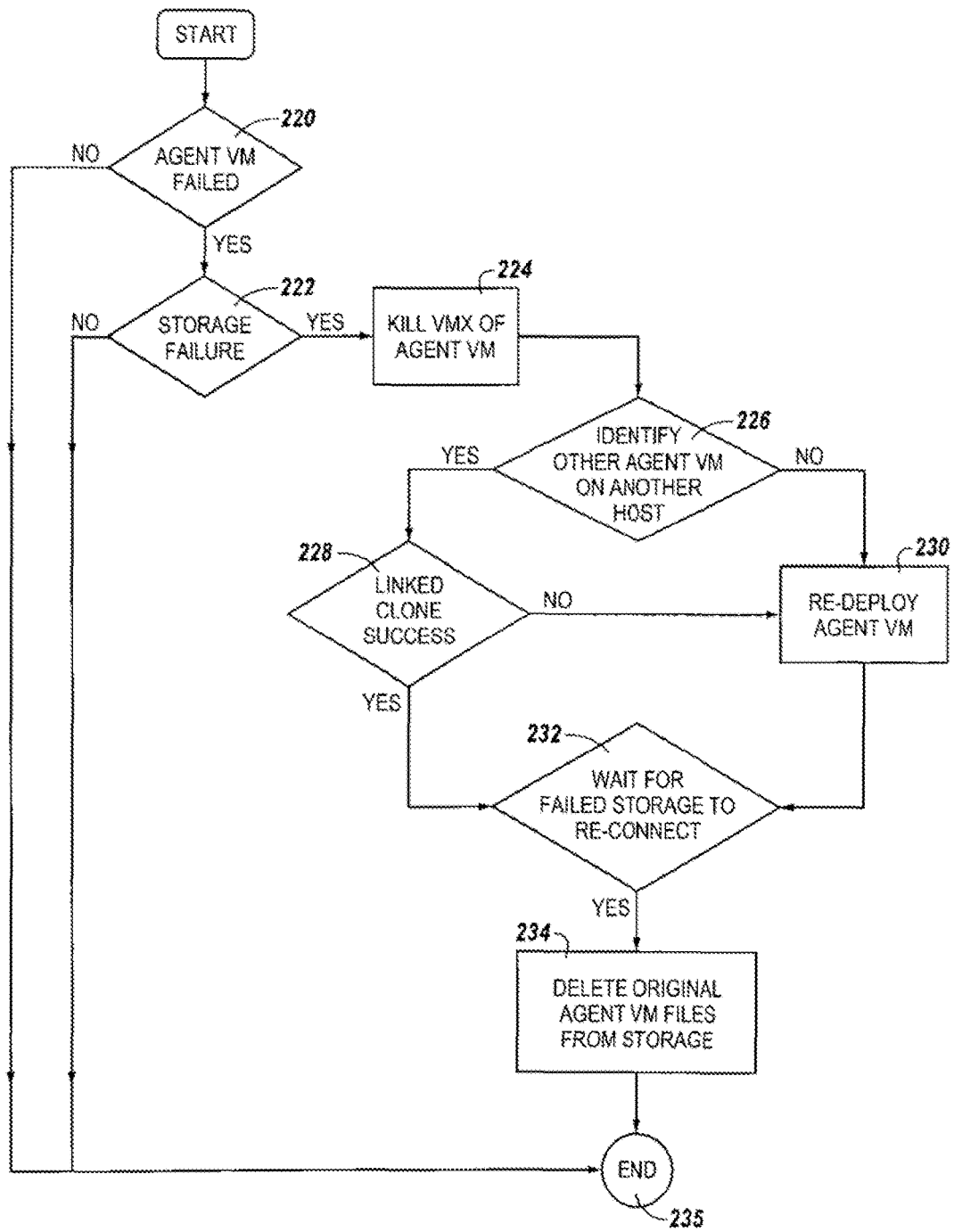
FIG. 2 is a flow chart illustrating a number of methods for providing availability of an agent VCI during a storage failure according to a number of embodiments of the present disclosure.

FIG. 2 is a flow chart illustrating a number of methods for providing availability of an AVCI during a storage failure according to a number of embodiments of the present disclosure. At 220, a determination is made that an AVCI has failed. The remainder of the method is initiated if that determination is made. If an AVCI does not fail, the method can end at 235. If an AVCI fails, embodiments of the present disclosure can, at 222, determine whether the failure was associated with a storage location associated with the AVCI (i.e., a storage failure). If the failure is not determined to be associated with a storage location associated with the AVCI, the method can end at 235, though not to the exclusion to other high availability solutions for a failed AVCI. A storage failure can be detected by monitoring events for storage where AVCIs are deployed. One such event may be permanent device loss (PDL), for instance. In order to detect the failure, one or more embodiments of the present disclosure can monitor a connectivity of the AVCI and a connectivity of its storage location. Traffic between various elements can be monitored. For example, in some embodiments, traffic (e.g., communications) in and out of the hypervisor can be monitored. In some embodiments, a failure can be detected if a connection state of the AVCI with respect to a hypervisor configured to execute the AVCI is "disconnected" and a status of the storage location associated with the AVCI is "inaccessible."

At 224, the execution of the AVCI by the hypervisor can be stopped (e.g., "killed"). Then, at 226, an attempt can be made to identify another AVCI being executed by another hypervisor. That is, embodiments of the present disclosure can determine whether a second AVCI that provides services analogous to the first AVCI is being executed by a second hypervisor and is deployed on a second storage location. The second hypervisor can be in a same cluster as the first hypervisor, as shown in FIG. 1, for instance. If it is determined that there is a second AVCI meeting those criteria, a linked clone of the second AVCI can be created on the second storage location as shown at 228. If it is determined that there does not exist a second AVCI meeting those criteria, or if the creation of the linked clone fails, the first AVCI can be redeployed on the second storage location as shown at 230. In some embodiments, the creation of a linked clone may be attempted before complete redeployment as the creation of a linked clone may consume less time and may be less computationally expensive than redeployment. After the failure is corrected at 232 (discussed further below), one or more files of the first AVCI can be deleted from the first storage location as shown at 234. In some embodiments, all files of the first AVCI can be deleted. After the failure is corrected, the linked clone of the second AVCI (or the redeployed first AVCI) on the second storage location executed by the first hypervisor can provide a same functionality to dependent VCIs executed by the first hypervisor as that previously provided by the first AVCI.

Figure 3:
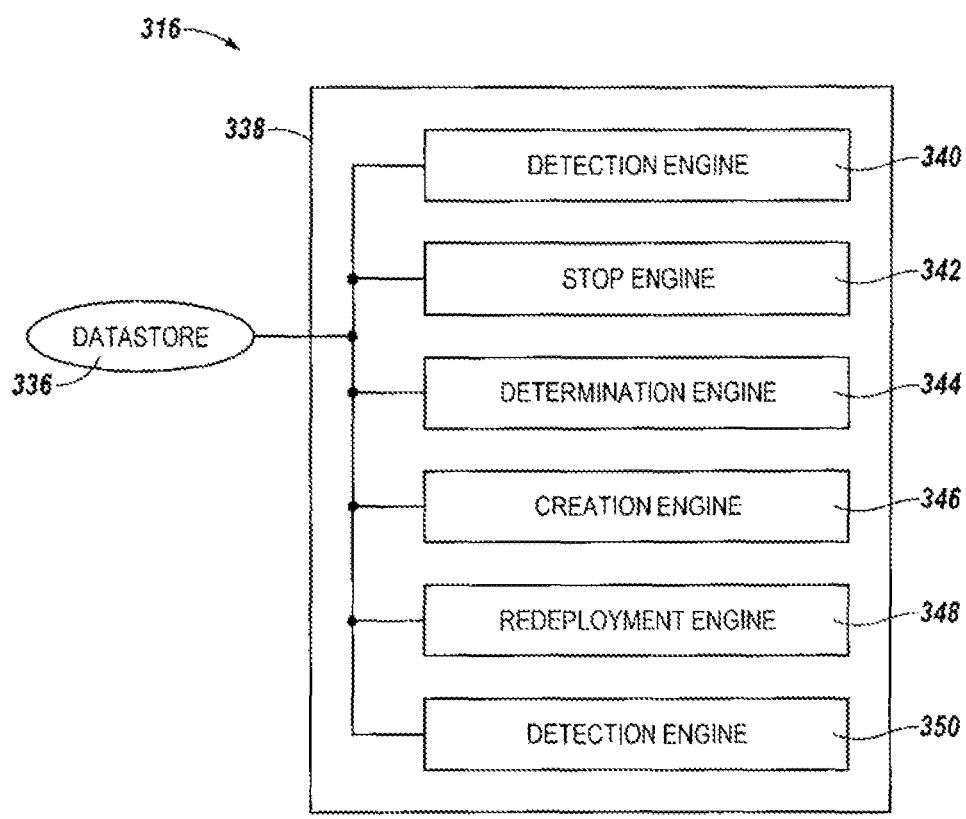
FIG. 3 is a diagram of a system including a number of engines for providing availability of an agent VCI during a storage failure according to a number of embodiments of the present disclosure.

FIG. 3 is a diagram of a system for providing availability of an AVCI during a storage failure according to a number of embodiments of the present disclosure. The system 316 can include a datastore 336, a subsystem 338, and/or a number of engines, for example detection engine 340, stop engine 342, determination engine 344, creation engine 346, redeployment engine 348, and/or deletion engine 350, and can be in communication with the datastore 336 via a communication link. The system 316 can include additional or fewer engines than illustrated to perform the various functions described herein. The system can represent program instructions and/or hardware of a machine (e.g., machine 452 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the detection engine 340 can include a combination of hardware and program instructions that is configured to detect a failure associated with a first storage location on which a first AVCI is deployed, wherein the first AVCI is being executed by a first hypervisor. A storage failure can be detected by monitoring events for storage where the first AVCI is deployed. In order to detect the failure, one or more embodiments of the present disclosure can monitor a connectivity of the first AVCI and a connectivity of the first storage location. Traffic between various elements can be monitored. For example, in some embodiments, traffic (e.g., communications) in and out of the first hypervisor can be monitored. In some embodiments, a failure can be detected if a connection state of the first AVCI with respect to the first hypervisor is "disconnected" and a status of the first storage location is "inaccessible."

In some embodiments, the stop engine 342 can include a combination of hardware and program instructions that is configured to stop the execution of the first AVCI. In some embodiments, stopping the execution of the first AVCI can include killing a Virtual Machine Executable (VMX) process of the first AVCI, for instance.

In some embodiments, the determination engine 344 can include a combination of hardware and program instructions that is configured to determine whether a second AVCI that provides services analogous to the first AVCI is being executed by a second hypervisor and is deployed on a second storage location. In some embodiments "services analogous to the first AVCI" can include services identical to those provided by the first AVCI. That is, providing analogous services can include providing the same services. In some embodiments, providing analogous services can include providing substantially similar services, or services exceeding a similarity threshold to those provided by the first AVCI.

In some embodiments, the creation engine 346 can include a combination of hardware and program instructions that is configured to create a linked clone of the second AVCI on the second storage location responsive to a determination that the second AVCI is being executed by the second hypervisor and is deployed on the second storage location. In some embodiments, the linked clone can be executed by the first hypervisor. That is, the linked clone can be created to be executed by the first hypervisor. The linked clone provides services analogous to the first AVCI and the second AVCI.

As referred to herein, a linked clone is a copy of a VCI that shares disks with the parent VCI. Thus, any changes made to the shared disks for the parent VCI will be propagated to the linked clone VCI. In some instances, linked clone VCIs may share some, but not all disks. For example, a parent VCI may have a shared disk with a linked clone VCI and the parent VCI may also have its own delta disk that is not shared with the linked clone VCI so that changes for the parent VCI can be made in the delta disk and not propagated to the linked clone VCI while changes that are intended to affect both the parent VCI and the linked clone VCI can be made in the shared disk. Linked clones can be created using the concept of VCI snapshots. A VCI snapshot can preserve the state of a VCI so that it can be reverted to at a later point in time. The snapshot can include memory as well. In some embodiments, a snapshot includes secondary storage, while primary storage is optionally included with the snapshot. A linked clone VCI can be constructed from a snapshot.

In some embodiments, the redeployment engine 348 can include a combination of hardware and program instructions that is configured to redeploy the first AVCI on the second storage location responsive to a determination that the second AVCI is not being executed by the second hypervisor or is not deployed on another storage location.

In some embodiments, the deletion engine 350 can include a combination of hardware and program instructions that is configured to delete files of the first AVCI from the first storage location after the failure is corrected. Correcting the failure can include deploying the linked clone on the second storage location, wherein the second storage location is in communication with the first hypervisor, for instance. Correcting the failure can include redeploying the first AVCI on the second storage location, wherein the second storage location is in communication with the first hypervisor, for instance.

Figure 4:
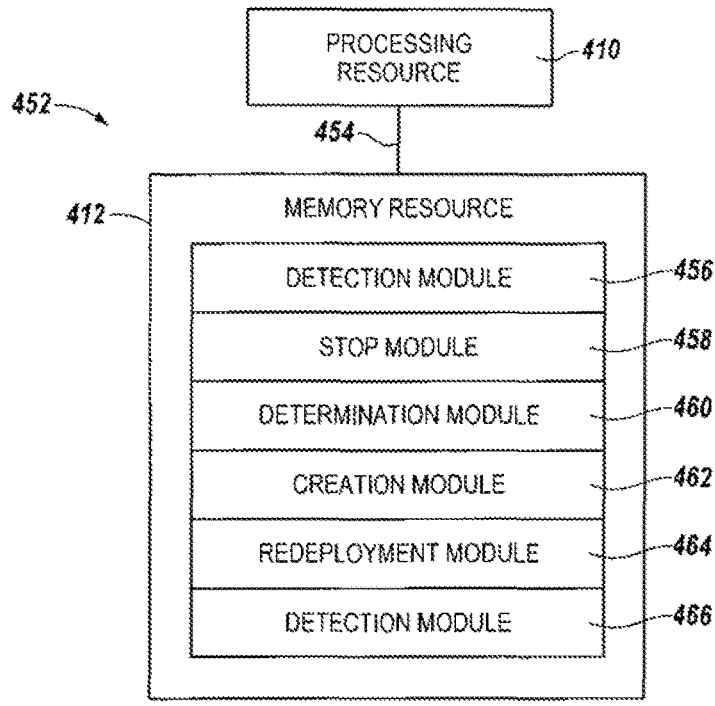
FIG. 4 is a diagram of a machine for providing availability of an agent VCI during a storage failure according to a number of embodiments of the present disclosure.

FIG. 4 is a diagram of a machine for providing availability of an AVCI during a storage failure according to a number of embodiments of the present disclosure. The machine 452 can utilize software, hardware, firmware, and/or logic to perform a number of functions. The machine 452 can be a combination of hardware and program instructions configured to perform a number of functions (e.g., actions). The hardware, for example, can include a number of processing resources 410 and a number of memory resources 412, such as a machine-readable medium (MRM) or other memory resources 412. The memory resources 412 can be internal and/or external to the machine 452 (e.g., the machine 452 can include internal memory resources and have access to external memory resources). In some embodiments, the machine 452 can be a cluster controller. The program instructions (e.g., machine-readable instructions (MRI)) can include instructions stored on the MRM to implement a particular function (e.g., an action such as deleting files of the first AVCI from the first storage location after the failure is corrected). The set of MRI can be executable by one or more of the processing resources 410. The memory resources 412 can be coupled to the machine 452 in a wired and/or wireless manner. For example, the memory resources 412 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 412 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 410 can be coupled to the memory resources 412 via a communication path 454. The communication path 454 can be local or remote to the machine 452. Examples of a local communication path 454 can include an electronic bus internal to a machine, where the memory resources 454 are in communication with the processing resources 454 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 454 can be such that the memory resources 412 are remote from the processing resources 410, such as in a network connection between the memory resources 412 and the processing resources 410. That is, the communication path 454 can be a network connection. Examples of such a network connection can include a local area network (LAN), wide area network (WAN), personal area network (PAN), and the Internet, among others.

As shown in FIG. 4, the MRI stored in the memory resources 412 can be segmented into a number of modules 456, 458, 460, 462, 464, 466 that when executed by the processing resources 410 can perform a number of functions. As used herein a module includes a set of instructions included to perform a particular task or action. The number of modules 456, 458, 460, 462, 464, 466 can be sub-modules of other modules. For example, stop module 458 can be a sub-module of the detection module 456 and/or can be contained within a single module. Furthermore, the number of modules 456, 458, 460, 462, 464, 466 can comprise individual modules separate and distinct from one another. Examples are not limited to the specific modules 456, 458, 460, 462, 464, 466 illustrated in FIG. 4.

Each of the number of modules 456, 458, 460, 462, 464, 466 can include program instructions and/or a combination of hardware and program instructions that, when executed by a processing resource 410, can function as a corresponding engine as described with respect to FIG. 3. For example, the detection module 456 can include program instructions and/or a combination of hardware and program instructions that, when executed by a processing resource 410, can function as the detection engine 340, the stop module 458 can include program instructions and/or a combination of hardware and program instructions that, when executed by a processing resource 410, can function as the stop engine 342, the determination module 460 can include program instructions and/or a combination of hardware and program instructions that, when executed by a processing resource 410, can function as the determination engine 344, the creation module 462 can include program instructions and/or a combination of hardware and program instructions that, when executed by a processing resource 410, can function as the creation engine 346, the redeployment module 464 can include program instructions and/or a combination of hardware and program instructions that, when executed by a processing resource 410, can function as the redeployment engine 348, the deletion module 466 can include program instructions and/or a combination of hardware and program instructions that, when executed by a processing resource 410, can function as the deletion engine 466.

Figure 5:
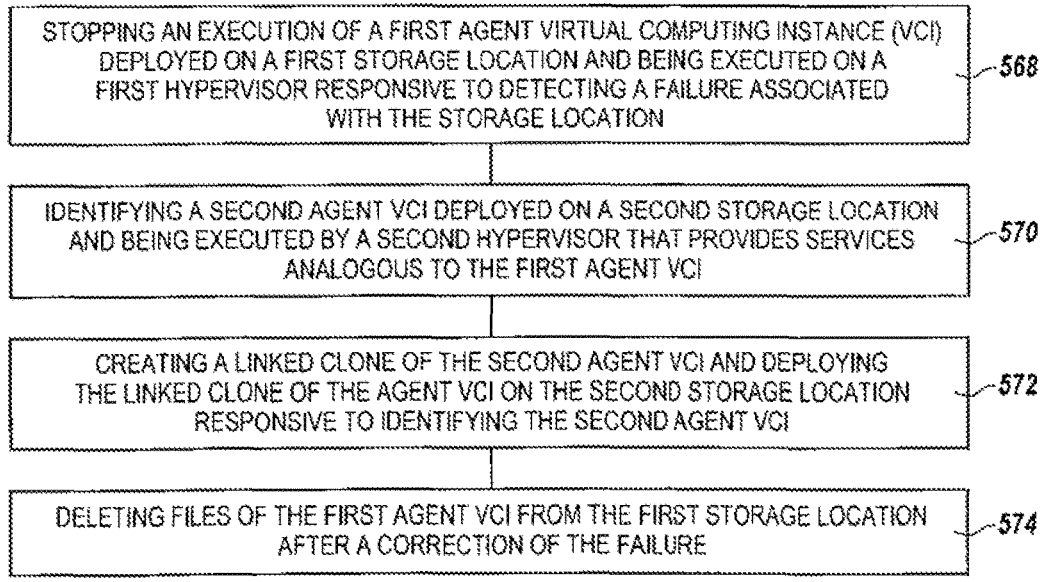
FIG. 5 illustrates a method providing availability of an agent VCI during a storage failure according to a number of embodiments of the present disclosure.

FIG. 5 illustrates a method providing availability of an AVCI during a storage failure according to a number of embodiments of the present disclosure. In some embodiments, the method can be performed by a cluster controller discussed herein, though the present disclosure is not so limited.

At block 568, the method includes stopping an execution of a first AVCI deployed on a first storage location and being executed by a first hypervisor responsive to detecting a failure associated with the storage location. If an AVCI fails, the method can include determining whether the failure was associated with a storage location associated with the AVCI (i.e., a storage failure) or some other failure. A storage failure can be detected by monitoring events for storage where AVCIs are deployed. One such event may be permanent device loss (PDL), for instance. In order to detect the failure, one or more embodiments of the present disclosure can include monitoring a connectivity of the AVCI and a connectivity of its storage location. Traffic between various elements can be monitored. For example, in some embodiments, traffic (e.g., communications) in and out of the first hypervisor can be monitored. In some embodiments, a failure can be detected if a connection state of the AVCI with respect to the first hypervisor is "disconnected" and a status of the first storage location is "inaccessible."

At block 570, the method includes identifying a second AVCI deployed on a second storage location and being executed by a second hypervisor that provides services analogous to the first AVCI. If a second AVCI that meets those criteria is identified, the method includes creating a linked clone of the second AVCI on the second storage location to be executed by the first hypervisor responsive to identifying the second AVCI at block 572.

At block 574, the method includes deleting files of the first AVCI from the first storage location after a correction of the failure. In some embodiments, the correction of the failure can include deploying the linked clone on the second storage location, wherein the second storage location is in communication with the first hypervisor. Thus, the files of the first AVCI can be deleted subsequent to (and/or responsive to) the creation of the linked clone. In some embodiments, the correction of the failure can entail the first storage location being reconnected with the first hypervisor. Thus, the files of the first AVCI can be deleted subsequent to (and/or responsive to the reconnection of the first storage location with the first hypervisor.

Figure 6A:
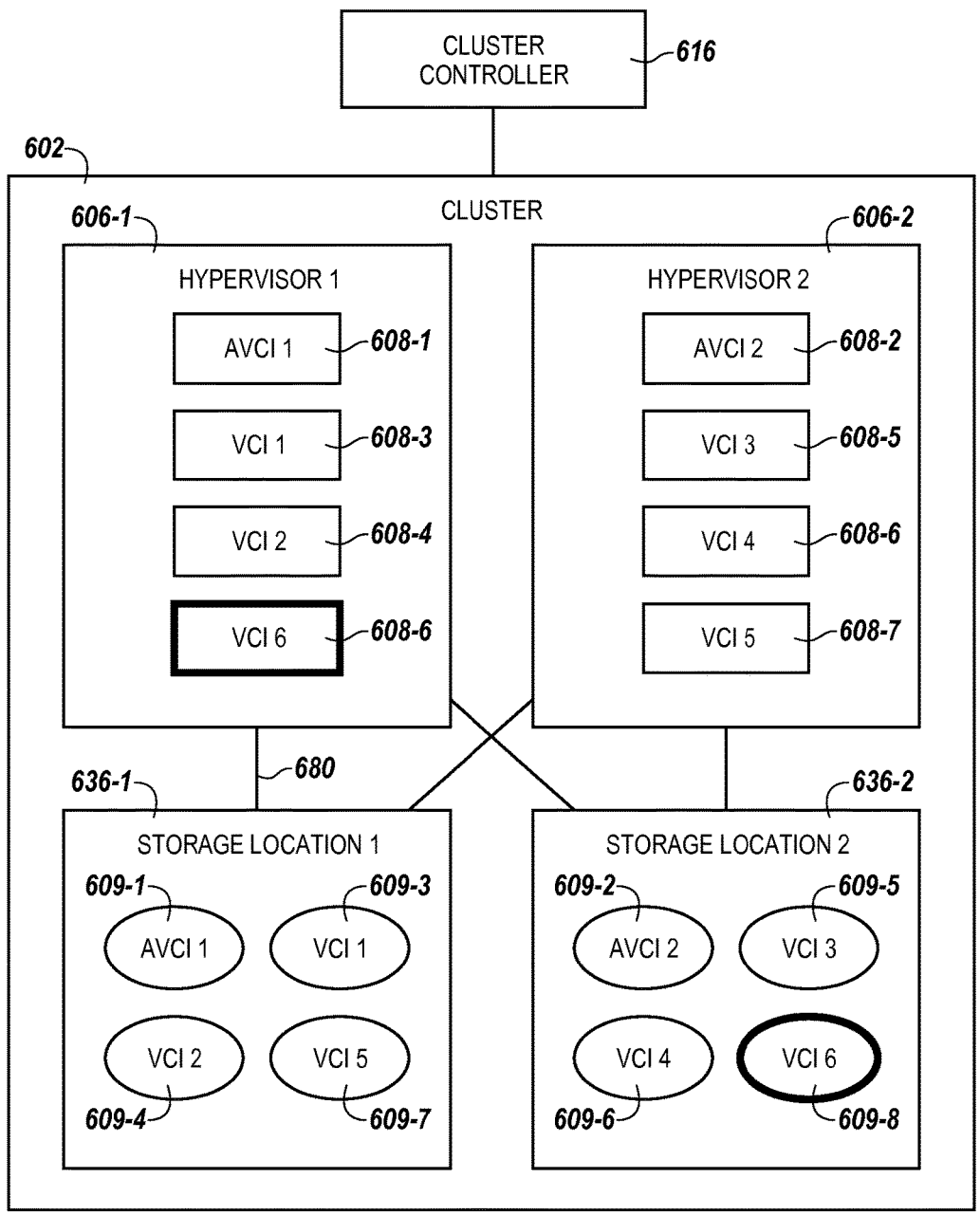
FIGS. 6A-6B illustrate a system for providing availability of an agent VCI during a storage failure via creation of a linked clone according to a number of embodiments of the present disclosure.
Figure 6B:
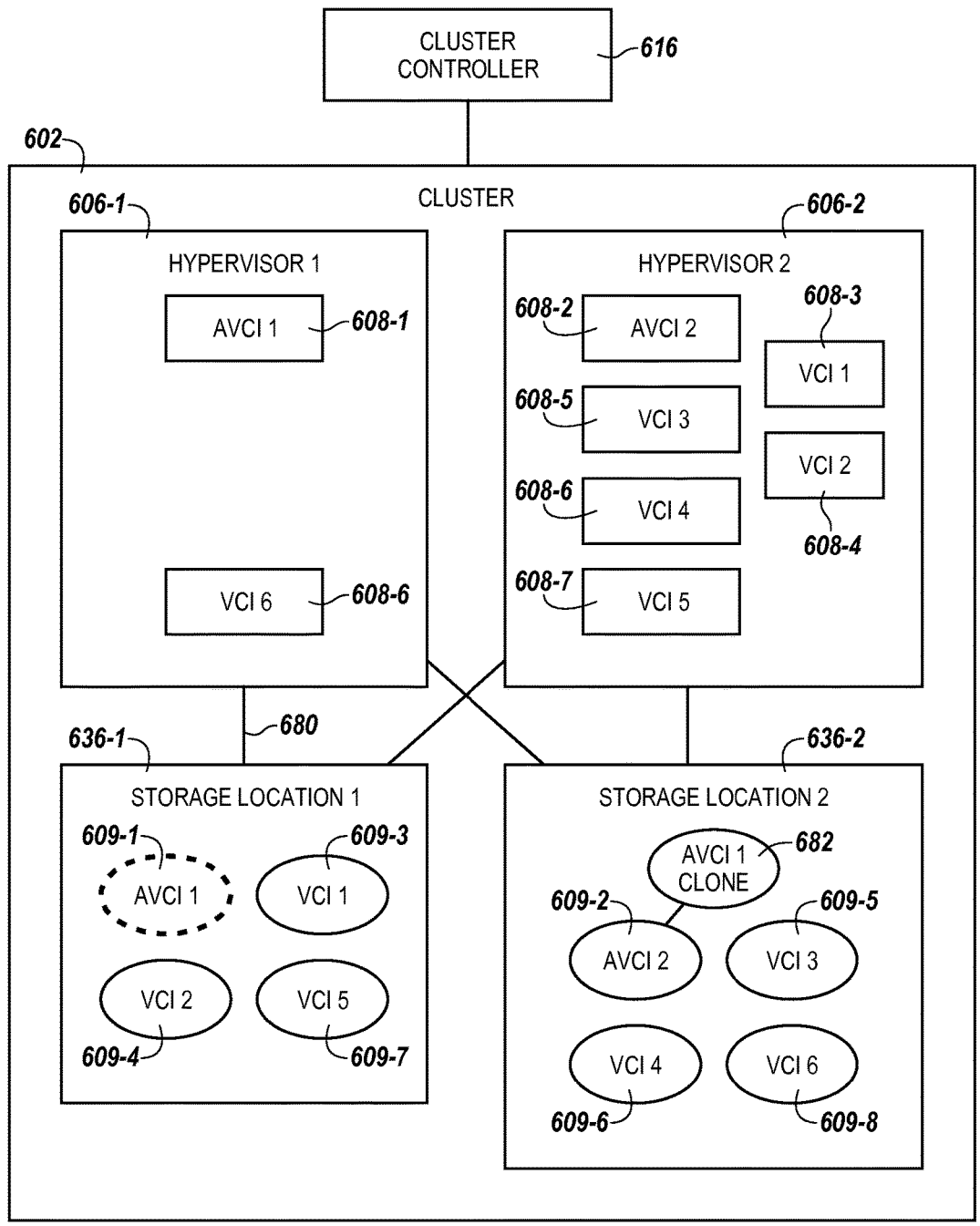

FIGS. 6A-6B illustrate a system for providing availability of an AVCI during a storage failure via creation of a linked clone according to a number of embodiments of the present disclosure. As shown in FIGS. 6A and 6B, the system includes a cluster controller 616 in communication with a cluster 602. Though embodiments of the present disclosure are not so limited, the cluster controller 616 and the cluster 602 can be respectively analogous to the cluster controller 116 and the cluster 102 previously described in connection with FIG. 1, for instance.

The cluster 602 includes a hypervisor1 606-1, a hypervisor2 606-2 (sometimes cumulatively referred to as hypervisors 606), a storage location1 636-1, and a storage location2 636-2. As shown in FIG. 6A, before a storage failure, a plurality of VCIs are executed by hypervisor1 606-1: an AVCI1 608-1, a VCI1 608-3, a VCI2 608-4, and a VCI6 608-8. Another plurality of VCIs are executed by hypervisor2 606-2: an AVCI2 608-2, a VCI3 608-5, a VCI4 608-6, and a VCI5 608-7 (sometimes cumulatively referred to as VCIs 608).

The VCIs 608 executed by the hypervisors 606 can be deployed on either storage location1 636-1 or storage location2 636-2. That is, disks associated with the VCIs 608 executed by the hypervisors 606 can be deployed on either storage location1 636-1 or storage location2 636-2. As shown in FIG. 6A, deployed on storage location1 636-1 are AVCI1 disk 609-1, VCI1 disk 609-3, VCI2 disk 609-4, and VCI5 disk 609-7. Deployed on storage location2 636-2 are AVCI2 disk 609-2, VCI3 disk 609-5, VCI4 disk 609-6, and VCI6 disk 609-8. It is noted that the quantity and type of VCIs 608 illustrated in FIGS. 6A and 6B are not to be taken in a limiting sense; embodiments of the present disclosure include other numbers and/or types of VCIs 608 than those shown. As shown in FIGS. 6A and 6B, a storage failure 680 causes a loss of connection between hypervisor1 606-1 and storage location1 636-1.

Subsequent to the determination of the storage failure 680, FIG. 6B illustrates that dependent VCIs, previously executed by hypervisor1 606-1, can be restarted by cluster controller 616 on hypervisor2 606-2. Accordingly, VCI1 608-3 and VCI2 608-4 are shown in FIG. 6B as being executed by hypervisor2 606-2 instead of hypervisor1 606-1. As previously discussed, the storage failure renders AVCI1 608-1 unavailable to provide its services to VCI6 608-8 because AVCI1 disk 609-1 and VCI6 disk 609-8 are deployed on different storage locations (i.e., storage location1 636-1 and storage location2 636-2, respectively). Accordingly, VCI6 608-8 (and VCI6 disk 609-8) is, for purposes of illustration, shown in FIG. 6A in bold because without the services provided by AVCI1 608-1, VCI6 608-8 is not compliant (e.g., not solution compliant).

As shown in FIG. 6B, the cluster controller 616 can create a linked clone of AVCI2 disk 609-2 in storage location2 636-2. AVCI2 disk 609-2 is associated with AVCI2 608-2, which provides services analogous to AVCI1 608-1. Because the linked clone is a copy of an AVCI disk associated with an AVCI that provides services analogous to AVCI1 608-1, the linked clone can be referred to as "AVCI1 clone 682" as shown in FIG. 6B. Because the connection between storage location2 636-2 and hypervisor1 606-1 is still active, AVCI1 608-1 can resume providing services to VCI6 608-8. AVCI1 clone 682 is shown in FIG. 6B as bold for purposes of illustration because, once created, it can be the disk associated with AVCI1 608-1, replacing AVCI1 disk 609-1 in that regard. When the storage failure 680 is corrected, files of AVCI1 disk 609-1 (e.g., the entirety of AVCI1 disk 609-1) can be deleted as indicated by the dotted line around AVCI1 disk 609-1.

Figure 7A:
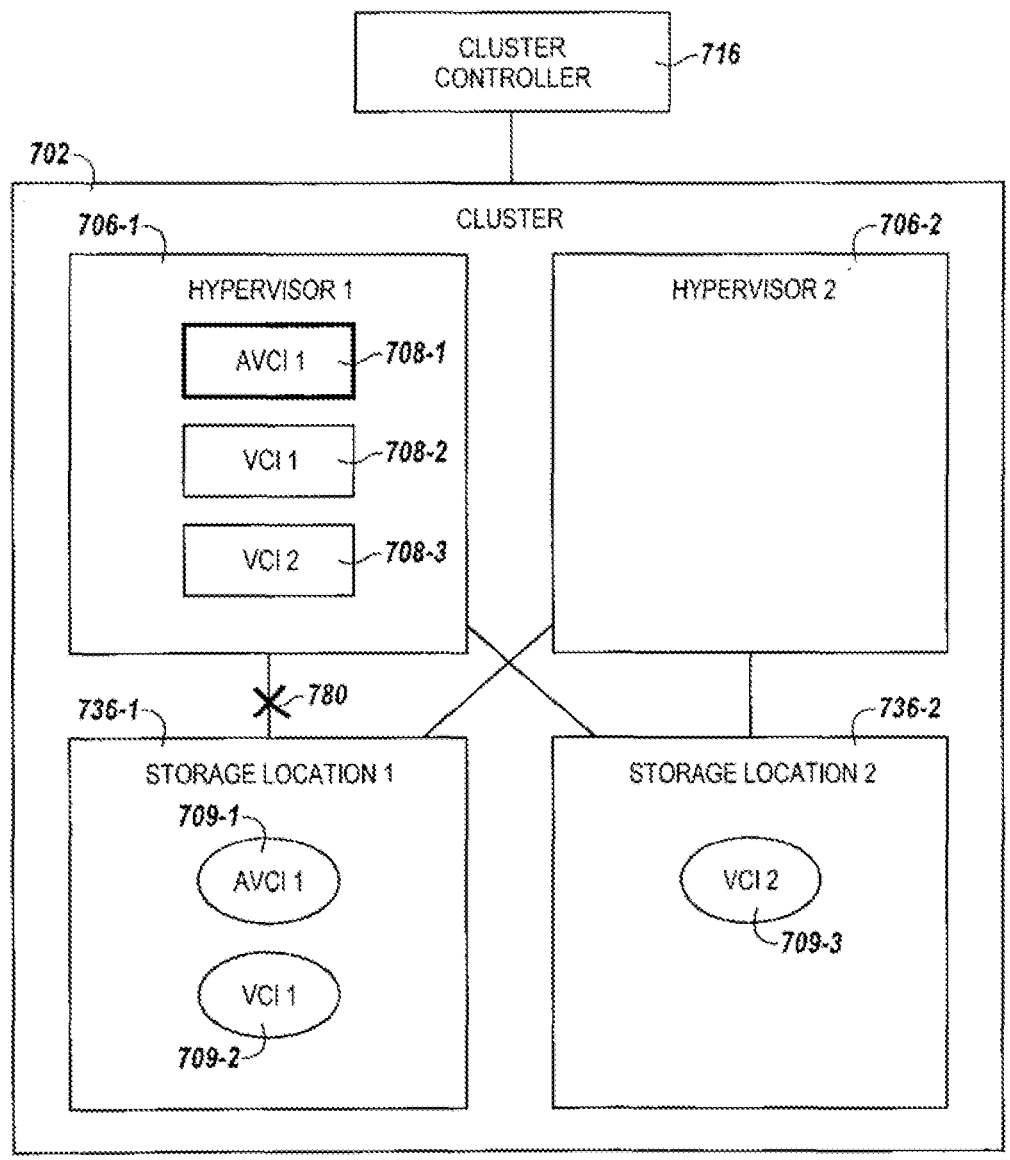
FIGS. 7A-7B illustrate a system for providing availability of an agent VCI during a storage failure via redeployment of the agent VCI according to a number of embodiments of the present disclosure.
Figure 7B:
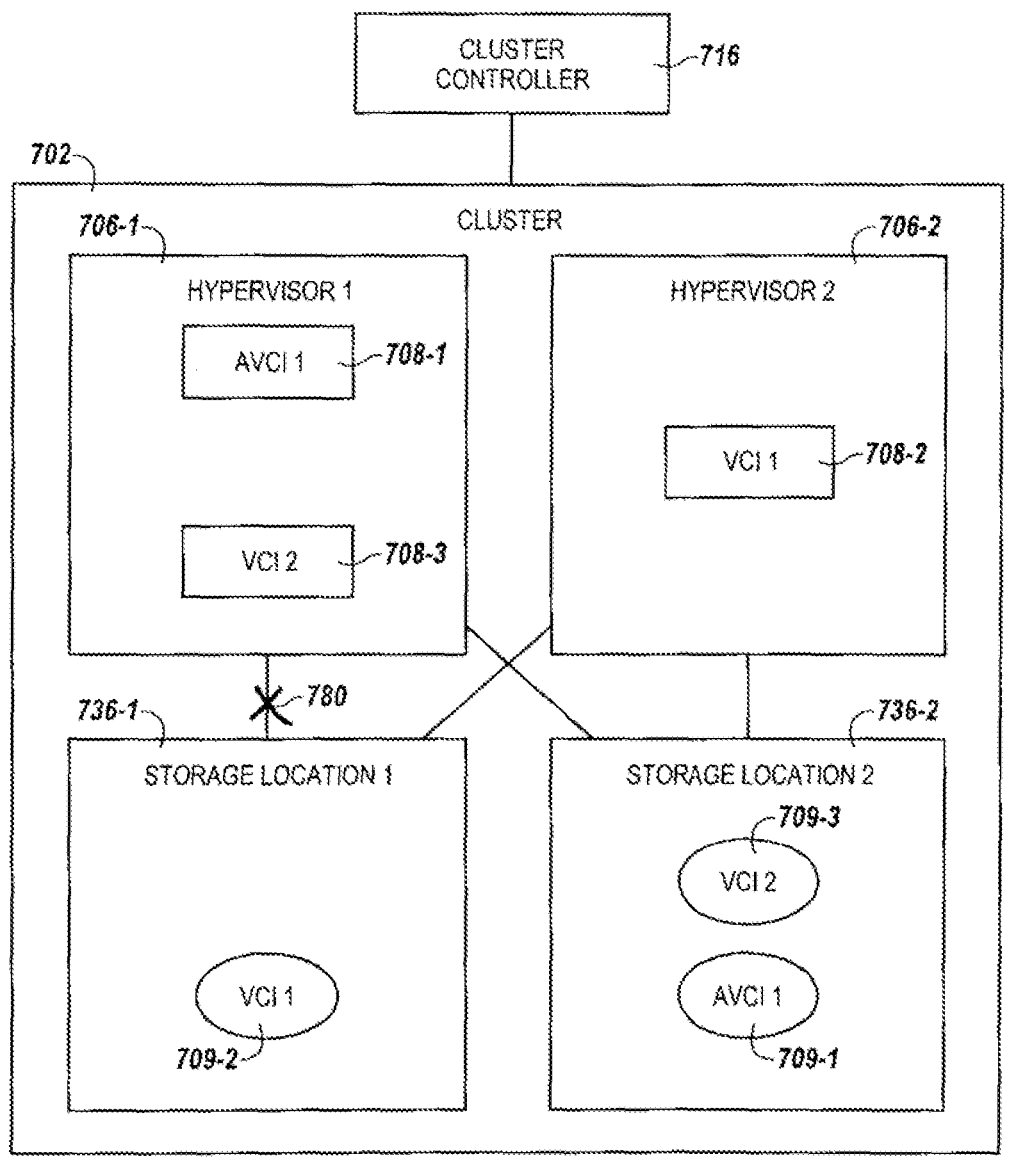

FIGS. 7A-7B illustrate a system for providing availability of an AVCI during a storage failure via the redeployment of the AVCI according to a number of embodiments of the present disclosure. As shown in FIGS. 7A and 7B, the system includes a cluster controller 716 in communication with a cluster 702. Though embodiments of the present disclosure are not so limited, the cluster controller 716 and the cluster 702 can be respectively analogous to the cluster controller 116 and the cluster 102 previously described in connection with FIG. 1, for instance.

The cluster 702 includes a hypervisor1 706-1, a hypervisor2 706-2 (sometimes cumulatively referred to as hypervisors 706), a storage location1 736-1, and a storage location2 736-2. As shown in FIG. 7A, before a storage failure, a plurality of VCIs are executed by hypervisor1 706-1: an AVCI1 708-1, a VCI1 708-2, and a VCI2 708-3 (sometimes cumulatively referred to as VCIs 708). Although not shown in FIG. 7A so as not to obscure embodiments of the present disclosure, one or more VCIs (including AVCIs) can be executed by hypervisor2 706-2.

The VCIs 708 executed by the hypervisors 706 can be deployed on either storage location1 736-1 or storage location2 736-2. That is, disks associated with the VCIs 708 executed by the hypervisors 706 can be deployed on either storage location1 736-1 or storage location2 736-2. As shown in FIG. 7A, deployed on storage location1 736-1 are AVCI1 disk 709-1 and VCI1 disk 709-2. Deployed on storage location2 736-2 is VCI2 disk 709-3. It is noted that the quantity and type of VCIs 708 illustrated in FIGS. 7A and 7B are not to be taken in a limiting sense; embodiments of the present disclosure include other numbers and/or types of VCIs 708 than those shown. As shown in FIGS. 7A and 7B, a storage failure 780 causes a loss of connection between hypervisor1 706-1 and storage location 736-1.

Subsequent to the determination of the storage failure 780, FIG. 7B illustrates that dependent VCI1 708-2, previously executed by hypervisor1 706-1, can be restarted by cluster controller 716 on hypervisor2 706-2. Accordingly, VCI1 708-2 is shown in FIG. 7B as being executed by hypervisor2 706-2 instead of hypervisor1 706-1. As previously discussed, the storage failure renders AVCI1 708-1 unavailable to provide its services to VCI2 708-3 because AVCI1 disk 709-1 and VCI2 disk 709-3 are deployed on different storage locations (i.e., storage location1 636-1 and storage location2 636-2, respectively). As shown in FIG. 7B, the cluster controller 716 can redeploy AVCI1 disk 709-1 on storage location2 736-2. As previously discussed, redeployment (rather than creation of a linked clone) may be undertaken in instances where another AVCI providing services analogous to the unavailable AVCI is identified as being executed by a second hypervisor and is deployed on a second storage location and/or if the creation of the linked clone fails. As shown in FIG. 7B, there are no other AVCIs providing analogous services being executed by hypervisor2 706-2. It is again noted that while one or more AVCIs, though not shown, can be executed by hypervisor2 706-2, it is to be understood that those AVCIs do not provide services analogous to those provided by AVCI1 708-1. Accordingly, AVCI1 disk 709-2 is redeployed on storage location2 736-2 rather than a linked clone created. Because the connection between storage location2 736-2 and hypervisor1 706-1 is still active. AVCI1 708-1 can resume providing services to VCI2 708-3.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium storing instructions executable by a processing resource to cause a computing system to:
   detect a failure associated with a first storage location on which a first agent virtual computing instance (VCI) is deployed, wherein the first agent VCI is being executed by a first hypervisor;
   stop the execution of the first agent VCI;
   determine whether a second agent VCI that provides services analogous to the first agent VCI is being executed by a second hypervisor and is deployed on a second storage location;
   create a linked clone of the second agent VCI on the second storage location responsive to a determination that the second agent VCI is being executed by the second hypervisor and is deployed on the second storage location;
   redeploy the first agent VCI on the second storage location responsive to a determination that the second agent VCI is not being executed by the second hypervisor or is not deployed on another storage location; and
   delete files of the first agent VCI from the first storage location after the failure is corrected.

2. The medium of claim 1, wherein the first agent VCI provides functionality to a dependent VCI, and wherein the dependent VCI is deployed on the second storage location.

3. The medium of claim 1, wherein the instructions to detect the failure comprise instructions to monitor a connectivity of the first agent VCI and a connectivity of the first storage location.

4. The medium of claim 1, wherein the instructions to detect the failure comprise instructions to detect that:
   a connection state of the first agent VCI is disconnected; and
   a status of the first storage location is inaccessible.

5. The medium of claim 1, wherein the failure being corrected comprises the first storage location being reconnected with the first hypervisor.

6. The medium of claim 1, wherein the second hypervisor is part of a same cluster as the first hypervisor.

7. The medium of claim 1, wherein the first agent VCI being executed by the first hypervisor provides functionality to any dependent VCI being executed by the first hypervisor.

8. The medium of claim 1, wherein the first agent VCI being executed by the first hypervisor provides functionality to a dependent VCI being executed by the first hypervisor regardless of a storage location on which the dependent VCI is deployed.

9. The medium of claim 1, wherein each of the first and the second hypervisor has read and write access to both of the first and the second storage locations before the failure and after the failure is corrected.

10. The medium of claim 1, including instructions to redeploy the first agent VCI on the second storage location responsive to a determination that the second agent VCI is being executed by the second hypervisor and responsive to a failure to deploy the linked clone.

11. A method for providing availability of an agent virtual computing instance (VCI) during a storage failure, comprising:
    stopping an execution of a first agent virtual computing instance (VCI) deployed on a first storage location and being executed by a first hypervisor responsive to detecting a failure associated with the storage location;
    identifying a second agent VCI deployed on a second storage location and being executed by a second hypervisor that provides services analogous to the first agent VCI;
    creating a linked clone of the second agent VCI on the second storage location to be executed by the first hypervisor responsive to identifying the second agent VCI; and
    deleting files of the first agent VCI from the first storage location after a correction of the failure.

12. The method of claim 11, wherein the method includes monitoring traffic in and out of the first hypervisor to detect the failure associated with the storage location.

13. The method of claim 11, wherein the linked clone of the second agent VCI provides services to at least one dependent VCI that are analogous to services provided by the first agent VCI to the at least one dependent VCI before the detection of the failure.

14. The method of claim 11, wherein the method includes restarting a dependent VCI on the second hypervisor, wherein the restarted dependent VCI is deployed on the first storage location, and is provided services by the first agent VCI.

15. The method of claim 11, wherein the correction of the failure includes deploying the linked clone on the second storage location, wherein the second storage location is in communication with the first hypervisor.

16. The method of claim 11, wherein the linked clone provides services analogous to the first agent VCI and the second agent VCI.

17. A system, comprising:
   an agent virtual computing instance (VCI) executed by a first hypervisor and deployed on a first storage location in a cluster;
   a first dependent VCI executed by the first hypervisor and deployed on the first storage location in the cluster;
   a second dependent VCI executed by the first hypervisor and deployed on a second storage location in the cluster; and
   a cluster controller in communication with the cluster and configured to:
      redeploy the agent VCI on the second storage location in response to detecting a failure associated with the first storage location; and
      restart the first dependent VCI on a second hypervisor that is in communication with the first storage location.

18. The system of claim 17, wherein the cluster controller is configured to delete files of the agent VCI from the first storage location after the agent VCI is redeployed on the second storage location.

19. The system of claim 17, wherein the cluster controller is configured to:
   redeploy the agent VCI on the second storage location without user input; and
   restart the first dependent VCI on the second hypervisor without user input.

20. The system of claim 17, wherein the cluster controller is configured to redeploy the agent VCI on the second storage location in response to detecting the failure associated with the storage location only if there is no other instance of the agent VCI being executed by the second hypervisor.

* * * * *